(12) United States Patent
Lukaszyk et al.

(10) Patent No.: US 8,387,120 B2
(45) Date of Patent: Feb. 26, 2013

(54) METHOD AND SYSTEM OF TRANSFERRING ELECTRONIC MESSAGES

(76) Inventors: Szymon Lukaszyk, Katowice (PL); Dawid Jablonski, Siemianowice Sl (PL)

( * ) Notice: Subject to any disclaimer, the term of this patent is extended or adjusted under 35 U.S.C. 154(b) by 318 days.

(21) Appl. No.: 12/669,675

(22) PCT Filed: Jul. 24, 2008

(86) PCT No.: PCT/PL2008/000055
§ 371 (c)(1),
(2), (4) Date: Jan. 19, 2010

(87) PCT Pub. No.: WO2009/014464
PCT Pub. Date: Jan. 29, 2009

(65) Prior Publication Data
US 2010/0211783 A1 Aug. 19, 2010

(30) Foreign Application Priority Data

Jul. 25, 2007 (PL) .......................................... 382998
Apr. 30, 2008 (PL) .......................................... 385076

(51) Int. Cl.
*H04L 29/06* (2006.01)
(52) U.S. Cl. ............................. 726/4; 713/168; 709/206
(58) Field of Classification Search .................. 713/168; 726/4; 709/206
See application file for complete search history.

(56) References Cited

U.S. PATENT DOCUMENTS

| 6,321,267 | B1 | 11/2001 | Donaldson |
| 6,393,465 | B2 | 5/2002 | Leeds |
| 6,691,156 | B1 | 2/2004 | Drummand et al. |
| 7,320,020 | B2 | 1/2008 | Chadwick et al. |
| 7,376,829 | B2 | 5/2008 | Ranjan |
| 2002/0052855 | A1* | 5/2002 | Landesmann ............... 705/400 |
| 2002/0104026 | A1* | 8/2002 | Barra et al. ................. 713/202 |
| 2003/0009698 | A1* | 1/2003 | Lindeman et al. ........... 713/201 |
| 2003/0110400 | A1 | 6/2003 | Cartmell |
| 2003/0200267 | A1 | 10/2003 | Garrigues |
| 2003/0236847 | A1 | 12/2003 | Benowitz |
| 2004/0064511 | A1* | 4/2004 | Abdel-Aziz et al. ......... 709/206 |

(Continued)

FOREIGN PATENT DOCUMENTS

EP 1575228 A 9/2005
NL 1027788 A 6/2006

(Continued)

OTHER PUBLICATIONS

International Search Report.

Primary Examiner — Michael Pyzocha
(74) Attorney, Agent, or Firm — William J. Sapone

(57) ABSTRACT

The invention relates to a method and system of transferring internet electronic messages (e-mails). The method comprises the steps of creating a first e-mail by sender's mail user agent (11) and authorizing the sender by sender's mail server (2). To reduce network traffic and limit activities of entities responsible of transferring SPAM the method further comprises the steps of (a) sending an authorization request, in one embodiment in a form a of a second e-mail comprising IP address of sender's local computer system (1), to a sender authorization sever, which in one embodiment is recipient's local mail server (42); (b) authorizing said local computer system (4); (c) accepting the first e-mail by recipient's server, which in one embodiment is recipient's local mail server (42), if said authorization request of intention of sending the first e-mail to this recipient was authorized by the sender authorization server.

16 Claims, 7 Drawing Sheets

U.S. PATENT DOCUMENTS

| | | |
|---|---|---|
| 2004/0221016 A1 | 11/2004 | Hatch et al. |
| 2004/0243847 A1 | 12/2004 | Way |
| 2004/0249897 A1 | 12/2004 | Espinosa |
| 2005/0081051 A1* | 4/2005 | Girouard et al. .............. 713/200 |
| 2005/0204133 A1 | 9/2005 | LaLonde |
| 2005/0256959 A1 | 11/2005 | Svensson |
| 2006/0053279 A1 | 3/2006 | Coueignoux |
| 2007/0005976 A1 | 1/2007 | Riittinen |
| 2007/0043813 A1 | 2/2007 | Pickup |
| 2008/0046814 A1* | 2/2008 | Harry et al. ................... 715/246 |
| 2008/0052400 A1* | 2/2008 | Ekberg .......................... 709/227 |
| 2008/0126856 A1* | 5/2008 | Levidow et al. ................. 714/19 |
| 2009/0144380 A1* | 6/2009 | Kallman et al. .............. 709/206 |
| 2009/0157829 A1* | 6/2009 | Choi et al. .................... 709/206 |

FOREIGN PATENT DOCUMENTS

| | | |
|---|---|---|
| WO | WO01/93503 A | 12/2001 |
| WO | WO2004/107137 A | 12/2004 |
| WO | WO2005/008983 A | 1/2005 |
| WO | WO2006/123328 A | 11/2006 |
| WO | WO2006/129962 A | 12/2006 |

* cited by examiner

METHOD AND SYSTEM OF TRANSFERRING ELECTRONIC MESSAGES

The invention relates to a method and system of transferring electronic messages via telecommunication network, and more specifically to a method and system of delivering internet electronic messages (e-mails), comprising the step of creating a message by a sender and the step of authorizing the sender by the sender authorization server.

GLOSSARY OF TERMS

Terms used in this specification have their defined or commonly accepted and used meanings that is quoted below:

"Server" denotes a program, a computer system or a device electronically connected with other servers and accepting commands for providing specific services by sending responses, such as file server, database server, and in particular mail server.

"Mail Server" or "Mail Transfer Agent" (MTA) denotes a server providing services of transferring electronic messages. Exemplary MTAs are programs Sendmail, Postfix, or MS6 Exchange Server.

"Simple Mail Transfer Protocol" (SMTP) is a communication protocol defining transfer of electronic messages across the Internet.

"Post Office Protocol version 3" ("POP3") is a communication protocol to retrieve electronic messages from a remote server.

"Internet Message Access Protocol" (IMAP) is a communication protocol contemplated to remedy some shortcomings of the POP3 protocol.

"Mail User Agent" (MUA) or "e-mail client" is a program enabling user to create, write, send and receive e-mails. In case of sending, MUA connects with MTA using SMTP and after establishing connection sends messages to MTA. In case of receiving, MUA connects with MTA using e.g. POP3 or IMAP protocol and downloads messages. Exemplary MUAs are local applications such as Mozilla Thunderbird or MS® Outlook Express®, server applications such as Berkeley Mail, Heirloom mailx or pine, or applications controlled by means of web browsers (e.g. MS® Explorer®, Mozilla Firefox®) such as Hotmail or Gmail generally referred to as "webmail".

"Domain Name System" (DNS) is a system of servers and a communication protocols ensuring translation of internet addresses between mnemonic form (e.g. www.uprp.pl) and numeric (IP) form (e.g. 217.17.45.3) used by internet servers. Further, DNS stores information about Mail Transfer Agent (s) of a given internet domain (e.g. uprp.pl).

"Fully Qualified Domain Address" (FQDA) is a string forming the Internet e-mail address comprising the local part, commonly denoting the user, symbol "@" and the domain part, commonly denoting internet domain in which the e-mail account of the user is located.

"Applet" denotes a software component constructed in a manner allowing it to be embedded in a web page and subsequently downloaded and executed in the context of a web browser of a computer system, in particular digitally signed and implementing Java, Flash or ActiveX technology and Cookies system.

"Servlet" or "server side script" denotes a software component executed by remote web server, on the basis of an information provided by user by means of a web browser, in particular digitally signed and implementing PHP, ASP, Borland Enterprise Server, etc. technology.

BACKGROUND OF THE INVENTION

In the past, servers transferring electronic messages accepted it from any sending server which was essential as the network connections were unreliable. If a given Sending server could not connect with the server of the recipient, it could at least pass over the message to any other relay server located closer to the recipient. This system however proven to be vulnerable to abuses from entities sending out unsolicited messages (SPAM) such as Unsolicited Commercial E-mail (UCE) or Unsolicited Bulk E-mail (UBE), which are illegal in many countries.

Reception of SPAM messages is presently out of control of the recipient, which at best (e.g. using appropriate filtering software) bears the costs of SPAM delivery, especially while accessing the net via dial-up connection. Transmission of SPAM also consumes resources of mail servers intermediating in this process. Mail servers receiving e-mails from any mail sending servers are called "open relay" servers and commonly such servers are not handled by other servers, because with a high' probability it may be assumed that the e-mails sent by such servers are SPAM messages. When open relay server attempts to send a message, a recipient's server is able to determine its address and check whether this server is listed on the public list of "open relay" servers. Such lists are managed for example by the "MAPS" Organization (http://www.mail-abuse.com), which also administers lists of RBL servers (Realtime Blackhole List—list of servers spreading SPAM messages) and DUL servers (Dial-Up User List—list of servers connected via switched lines, from which servers SPAM messages are sent directly to recipient's servers).

Commonly used technique for protection against SPAM messages involves appropriate configuration of sending server in such a way that sender has to be authorized before sending a mail. Thanks to this solution, only mails from senders that may log on to the mail sending server and whose identity is in this way confirmed by this server, shall be transferred further to the addresses of receiving servers designated in the messages. In case of an electronic mail, such type of service is called as SMTP AUTH and is defined in RFC 2554 (Request For Comment) normalization standard.

Additional method used in connection with the one described above is a method in which receiving server accepts only e-mails for which the address of the sender corresponds to the address of the sending server. In other words, a sender is able to send messages only by means of the server being capable to authorize sender's identity. In practice, a sender authorization server is a server of a sender mail box or any other server connected with such a server, and a comparison of the sender address with the address of the sending server may consist in checking whether a domain part of sender FQDA address corresponds to a domain part of the sending server address.

Particular steps of a typical, prior art method of transferring e-mail messages between sender's mail user agent and recipient's mail user agent, employing both techniques described above are illustrated below with reference to FIGS. 1 and 4. FIG. 1 schematically illustrates typical system of transferring e-mails between sender's local computer system 1 and recipient's local computer system 4 by means of or through sender's mail server 2 and recipient's mail server 3, while FIG. 4—individual steps of transferring the message. Usually, particular computer systems 1-4 are located remotely to each other and interconnected by means of a network employing TCP/IP protocol. A local sender's mail user agent 11 is installed on the senders computer system 1 (such as sender's personal computer, laptop, etc.), while a local recipient's mail user agent 41 is installed on the recipient's computer system 14.

As shown in FIG. 4a, in the first step an e-mail message is created by the sender with usage of mail user agent 11. Except for its subject matter, an e-mail includes also among other things a FQDA address of at least one recipient and a FQDA address of the sender. Subsequently, local mail user agent 11 makes an attempt to login to a sender's server 2, on which the sender has its e-mail account. The login process is realized with using a SMTP AUTH mechanism as well as user name and passwords provided by the sender, which data are usually stored in encoded form by a local MUA 11 of the sender. If login process is performed correctly, sender's MUA 11 sends created e-mail message to a sender's server 2 and, if there is no more messages to send, interrupts connection with sender's server.

In the next step, which is not shown in FIG. 4, the sender's server 2 translates FQDA addresses of each of the recipients indicated in the message, and using DNS mechanism determines recipient's server 3 of each specified recipient. As shown in FIG. 4b, sending server 2 connects then with a server of a given recipient 3. At the present step of sending a message, each server making a connection with recipient's server 3 shall be rather recognized as "sending server" instead of "sender's server", as its identity has not be yet verified. After establishing a connection, the sending server 2 indicates the sender of the message (using for example "MAIL FROM" command). If a domain part of a FQDA address does not match a domain part of the address of the sending server 2, a recipient's server 3 returns error reply informing about an error and refuses to accept the message. In the opposite instance, a recipient's server 3 returns OK reply enabling the sending server 2 to inform (for example using "RCPT TO" command) about the data of the recipient of the message, and, if a given receiving server 3 is suitable for the given recipient, to send messages and to disconnect.

An exemplary session of connection between the sending server 2 and the recipient's server 3 shown in FIG. 4b is presented below, where "R" denotes commands and replies send by the recipient's server and "S" denotes commands send by the sending server:

| Step | Server | Command |
| --- | --- | --- |
| (1) | R: | 220 BBN-UNIX.ARPA Simple Mail Transfer Service Ready |
| (2) | S: | HELO HOST1.USC-ISIF.ARPA |
| (3) | R: | 250 BBN-UNIX.ARPA |
| (4) | S: | MAIL FROM:<Smith@USC-ISIF.ARPA> |
| (5) | R: | 250 OK |
| (6) | S: | RCPT TP:<Jones@BBN-UNIX.ARPA> |
| (7) | R: | 250 OK |
| (8) | S: | DATA |
| (9) | R: | 354 Start mail input; end with <CRLF>.<CRLF> |
| (10) | S: | This is a test mail . . . |
|  | S: | Blah blah blah . . . |
|  | S: | . |
| (11) | R: | 250 OK |
| (12) | S: | QUIT |
| (13) | R: | 221 BBN-UNIX.ARPA Service closing transmissions channel |

As shown, the sending server identified itself in step (2), and its domain part (USC-ISIF.ARPA) corresponds to domain part of the sender's address which was provided in step (4). It is of course one of the simplest systems of verification of the sender's server, as well as the sender itself. In the prior art methods of transferring of electronic message, data identifying the sender and/or recipient and/or the address of the sending server is contained most often in the message itself or follows from the actual IP address of the sending server or hitherto existing former history of transmission of the message.

The last step of a process of sending a message is its delivering to s a recipient's local mail user agent 41, residing in recipient's local computer system 4. As shown in FIG. 4c, a recipient's local mail user agents logs in to a recipient's server 3 and, after passing through a logging procedure, the MUA downloads e-mail messages stored on the recipient's server. The above discussed steps of a process of transferring electronic messages, as illustrated on FIGS. 4a and 4b, are carried out with using SMTP protocol, whereas during the steps illustrated on FIG. 4c POP3 or IMAP protocols are used.

European patent specification EP 1 575 228 discloses a method and apparatus for reducing e-mail spam and virus distribution in a communications network by authenticating the origin of e-mail messages. The described method includes receiving at the sender's server a query to determine whether an e-mail message was sent be an indicated (in this message) user; checking logged data at the sender's server to determine whether the e-mail message in fact corresponds to a message sent from the sender's server, and responding to said query to authenticate the e-mail message origin.

The term "known method" or "known method of transferring the message" as used in this specification, denotes a process of sending messages according to any known and used prior art method, and particularly according to the method illustrated by FIGS. 1 and 4.

Using known methods of sending electronic messages, message needs to be transferred three times: firstly between sender's local mail user agent 11 residing on sender's personal computer 1 and sender's mail server 2; secondly between sending mail server 2 and recipient's mail server 3; and for the third time between a recipient's server 3 and a recipient's local mail user agent 41. On the other side, common e-mail messages still grows larger in terms of a size of data that needs to be sent, what results among other things from a message format (e.g. HTML or formatted text), but mainly from a size and a number of additional files attached to e-mails (attachments). In case where the sender is located in a place near the recipient but his mail server is in a remote location, known methods generate a considerable load in network traffic. Let us consider the sender having an e-mail account handled by a server in Warsaw, Poland, who is on a business travel in Beijing, from where using mail user agent residing on his personal laptop computer he intends to send a message to a contractor being also in Beijing, whose server is installed in Chicago. The message shall be sent for the first time to the sender's server in Poland, then from Poland to Chicago and eventually back again to the recipient's in Beijing.

The aim of the invention is to provide a method and system of transferring electronic messages via telecommunication network, and particularly a method and system of transferring internet electronic messages (e-mails), which would cause a decrease in a network traffic load, wherein the implementation of the solutions according to the invention might be able to be gradually introduced to the existing environments of transferring messages (in other words the invention should feature backward compatibility in relation to existing systems). The aim of the invention is also providing a method and system of transferring electronic messages, which would provide considerably limitation of activity of entities responsible for spreading SPAM Messages.

SUMMARY OF THE INVENTION

The invention relates to a method of transferring electronic messages via telecommunication network, comprising the steps of:
(a) sending an authorization request of intention of sending a message to a specified at least one recipient to a sender authorization server;
(b) authorizing said authorization request of intention of sending a message to a specified at least one recipient by the sender authorization server; and
(c) accepting said message to a specified at least one recipient by the server of this recipient if said authorization request of intention of sending a message to this recipient was authorized by the sender authorization server.

Preferably said sender authorization server is a server of the sender mail box (sender's MTA). This enables to employ known solutions, such as "POP" before "SMTP" or "SMTP AUTH" services described above. It is of course possible to use other network servers capable of confirming the identity of the remote sender.

Preferably said step (b) of authorizing said authorization request of intention of sending a message to a specified at least one recipient by the sender authorization server involves registration of said authorization request. Registration may be saved in logs or database of the authorization server, any other server connected to sender authorization server or even recipient's server.

Said authorization request of intention of sending a message to a specified at least one recipient being send in said step (a) preferably comprises at least address of said at least one recipient and optionally at least one additional parameter chosen among others from the address of the sender, signature or the subject of the message, date and time of creating or sending the message and/or lists of attachments of the message.

Said authorization of intention of sending a message to specified at least one recipient by the sender authorization server performed in step (b) is preferably valid within a predefined period and/or invalidated after step (c).

The method according to the invention may after step (b) comprise additional step of sending by sender authorization server to the sender an authorization confirmation of intention of sending the message to at least one recipient. This allows the sender to send the message using a known method if sender authorization server does not confirm authorisation e.g. because it does employ the method of the present invention. Moreover, the method may prior step (c) comprise additional step of sending by a recipient's server to sender authorization server an authorization query about the intention of sending the message to this recipient. This query may also be sent to a server appropriate to authorize given recipient, e.g. in an attempt to send to the recipient's server a message from open relay server or DUL listed server. Also, after step (b) the method according to the invention may comprise additional step of sending authorization server to recipient's mail server information about authorization of an intention to send a message to this recipient. After receiving such a message, recipient's server is ready to accept a message delivered from a specified sender.

Further the method according to the invention may comprise an additional step of sending by recipient's local mail server to recipient authorisation server a message informing about the IP address of the recipient's local mail server. Thanks to that recipient authorization server, that is a server with which sending servers connects in order to send a message addressed to a given recipient, may transfer the message directly to recipient's local MTA operating on his local computer system. IP address information message is preferably send whenever IP address of recipient's local computer changes. In case recipient's local MAT is offline, recipient authorization server may obviously receive messages operating as recipient's remote MTA.

Especially in this case, it is advantageous if before step (c) the method comprises an additional step of sending by the recipient authorization server to sender authosiation server or sender's local mail server a message informing about the IP address of the recipient's local mail server. Therefore authorised e-mail may be delivered directly to recipient's local mail server.

Preferably identity of sender authorisation server and/or identity of recipient authorisation server is confirmed by appropriate certificate, such as certificate issued by Verisign® (http://www.verisign.com) or ThawteT™ (http://www.thawte.com).

Preferably authorisation request of intention of sending a message to a specified at least one recipient is itself an electronic message. This allows employing a method of the invention in known system of transferring e-mails with no need of their substantial modification. Such a modification of an e-mail system might comprise e.g. an extension of SMTP protocol with additional commands (e.g. AUTR for authorisation request, ROAD in order to inform about recipient's local server, etc.), or comprise appropriate configuration of mail servers.

In particular, the invention relates to a method of transferring Internet e-mails comprising the steps of creating a first e-mail by a sender and authorising the sender by the sender's mail server, which further comprises the steps of:
(a) creating and sending a second e-mail comprising an authorisation request of intention of sending a message to a specified at least one recipient to a sender authorisation server;
(b) authorising said authorisation request of intention of sending a message to a specified at least one recipient by the sender authorisation server; and
(c) accepting said message to a specified at least one recipient by the server of this recipient, if said authorisation request of intention of sending a message to this recipient was authorised by the sender authorisation server, wherein
the sender authorisation server is a recipient's local mail server; the authorisation request contained in the second electronic message comprises at least IP address of the sender's local computer system and recipient e-mail address and optionally at least one additional parameter, and the second electronic message is transferred by senders local mail server to remote sender's mail server, then to at least one mail server of specified at least one recipient and eventually it is received by the recipient's local mail server; where authorising by the sender authorisation server said authorisation request of intention of sending a message to a specified at leastone recipient comprises creating and sending by recipient's local mail server to sender's local mail server an authorisation request confirmation which comprises at least IP address of recipient's local computer system and optionally at least one additional parameter; and a method comprises an additional step of sending the first electronic message by sender's local mail server to at least one local mail server of specified at least one recipient.

In a prior art commonly used systems of transferring e-mails, they are transferred between mail servers using a peer to peer (P2P) architecture, however transfer of messages between MTAs and local computers of e-mail users is supported by client-server architecture. The method of the invention enables to supplement or overlay the whole system of e-mail transfer with the P2P architecture, reducing network overload, increasing privacy and safety of e-mail transmission and reducing SPAM distribution which shall be explained later. Additionally, the method of the invention features backward compatibility over known systems of e-mails transfer and transparency of usage for end users.

Although explanations below relates mainly to transfer of e-mails between sender's local mail server and recipient's local mail server, it is obvious that such notation depends only on the function (sending or receiving) performed by given server during a given stage of transfer, and both of them shall advantageously perform both of these functions.

Preferably said authorisation request confirmation is itself an electronic message and is transferred by recipient's local mail server to sender's local mail server via outgoing mail server of a specified recipient and sender's incoming mail server.

Thanks to that not only sender is verified by sending authorisation request but also recipient who sends authorisation request confirmation back to sender. Furthermore servers distributing SPAM, in particular zombie computers, are not usually configured to receive messages (otherwise they would be vulnerable to be blocked by traffic of servers of organisations fighting against SPAM distribution).

Alternatively said authorisation request confirmation is transferred by recipient's local mail server directly to sender's local mail server.

This allows establishing P2P channel to send and receive message between sender and recipient and vice versa instantly on the basis of IP address of a sender's local computer provided in authorisation request e-mail and IP address of recipient's local computer system provided in authorisation request confirmation e-mail. The channel may be active as long as these addresses unequivocally points to local computers of sender and recipient. Otherwise sender's local mail server may automatically send subsequent authorisation request through sender's mail server to recipient's mail server, where from it shall be received by recipient's local mail server in order to establish the P2P channel again.

It is however advantageous if recipient's local mail server sends to the sender's local mail server authorisation request confirmation whenever the recipient's local mail server IP address changes.

Thanks to that the P2P e-mail channel is maintained between local mail servers since each one of them knows IP address of its partner. If only address of one of them changes, e.g. due to breaking of internet connection and dynamic assignation of a new address from available pool of IP addresses, change of localisation, Internet Service Provider, etc., than the local mail server immediately informs the counterpart about this fact and establishes P2P channel again. The P2P channel would be broken only if both of these systems changed their IP addresses in the same time or remained offline for longer period of time.

Additional parameters of authorisation request described above are preferably chosen from sender's cryptographic public-key (encrypting), an information promoting P2P transfer and/or text of the first electronic message created by the sender, while said additional parameters of said authorisation request confirmation are chosen from recipient's cryptographic public-key (encrypting), acceptable types and sizes of attachments, acceptable size and/or other parameters of the first electronic message that are acceptable by the recipient.

Encrypting and decrypting keys allow establishing encrypted P2P channel between local computer systems of sender and recipient, such as symmetric or more preferably asymmetric TLS (Transport Layer Security) channel, operating on TCP layer, in which encryption of data streams is performed by means of two public keys and decryption by means of private keys, each one of which is known only to sender and recipient.

Furthermore it is possible e.g. to send text of the first e-mail created by sender along with authorisation request using known e-mail transfer system, while attachments of the first e-mail shall be delivered later after establishing P2P channel. If recipient does not use the P2P transfer method, the additional information may serve for promotion of the method according to the present invention, e.g. by encouraging installation of P2P enabled local mail server or mail user agent, implementing the method of the invention.

Preferably prior the step of sending the first electronic message, the method involves more than one exchange of an authorisation request and corresponding authorisation request confirmation between sender's local mail server and recipient local mail server in order to negotiate the form of the first electronic message that is acceptable by recipient's local mail server.

Preferably sender's local mail server and/or recipient's local mail server has a form of an application operating in between local mail user agent and remote mail server.

The application may operate e.g. as a SMTP server bound to port 23 and POP3 server bound to port 80 of sender's/recipient's local computer system (localhost, IP 127.0.0.1) and after appropriate configuration of mail user agent by indicating that localhost shall serve both as the incoming and outgoing mail server and after appropriate configuration of the application itself by indicating actual remote mail servers for incoming and outgoing e-mails, intercept messages that are sent or received. In particular the application may transparently supplement the first e-mail created by sender with authorisation request or temporarily save locally the first e-mail creating new authorisation request, and than send it as e-mail to recipient having a similar application which appropriately interprets authorisation request and sends authorisation request confirmation back to sender.

Moreover the application may operate on a different port (e.g. 272) and use dedicated protocol (other than SMTP) for P2P transmission according to the invention.

Alternatively or additionally sender's local mail server and/or recipient's local mail server may be integrated with local mail user agent.

In this case e-mail client is enabled with incorporated mechanisms of sending and receiving authorisation requests and confirmations or establishing P2P channels right after its installation.

In yet another embodiment local mail user agent may be operated via a web browser (webmail) and sender's local mail server and/or recipient's local mail server may have a form of an applet installed on a sender's local computer system and/or recipient's local computer system and operated via a web browser and/or via local mail user agent.

This enables to employ the invention in webmail systems. Applets operating as local mail servers may be implemented e.g. in Java and ensure direct connection between sender's and recipient's local computer systems.

Said steps (a) to (c) of each variant of the method of the present invention are advantageously performed if the volume of the message exceeds a predefined threshold. Therefore small messages (e.g. smaller that 4 MB) may be still transferred using commonly used system of e-mail transmission.

The invention also relates to a system of transferring electronic messages via telecommunication network, in particular a system of transferring internet electronic messages (e-mails), which operates according to any variant of the method described above.

Furthermore the invention relates to a computer-readable storage medium containing executable instructions for a system of transferring electronic messages via telecommunication network, in particular for a system of transferring internet electronic messages (e-mails), wherein said executable instructions comprise an execution of steps of any variant of the method described above.

BRIEF DESCRIPTION OF THE DRAWINGS

The invention is shown in its advantageous exemplary embodiments with reference to the drawings, in which.

DETAILED DESCRIPTION OF THE INVENTION

In systems of transferring electronic messages shown in FIGS. 1-3, 7 and 8 particular steps of transferring messages between individual computer systems and servers are indicated by thick arrows representing transfer of electronic messages and thin curved arrows representing transferring auxiliary control communications (commands, queries, authorisation messages, confirmation replies, etc.). It should be understood however that each step of transferring a message has usually a form of some kind of dialogue comprising mutual exchanging of communicates between servers. Though in the description a simplified terminology is used (e.g. "server sends a request", "a server sends a query", "a server responds"), for the persons skilled in the art it is obvious that computer servers, and in particular internet mail servers, communicate in this way as defined for SMTP protocol in RFC 821, RFC 2821 and RFC 1869 normalization standards, which are therefore included into this description by reference. A communication process with a mail server may also be realized in this way manually manner using appropriate software, such as telnet application.

Figure 1:
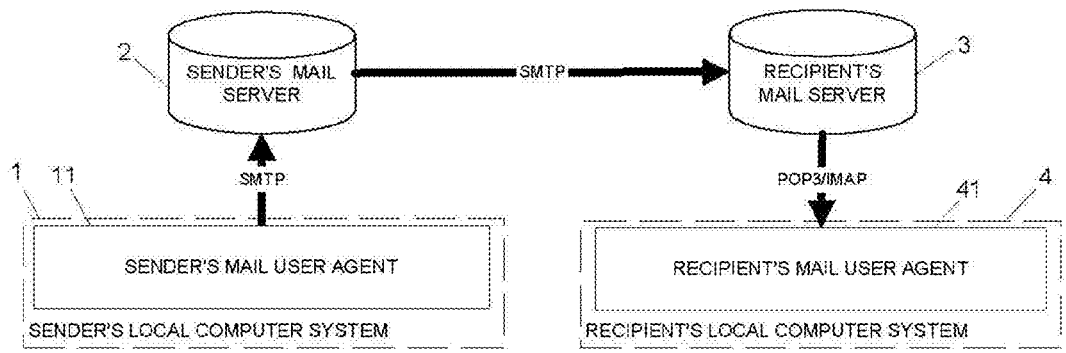
FIG. 1 shows a typical prior art system of transferring electronic messages via computer network.
Figure 2:
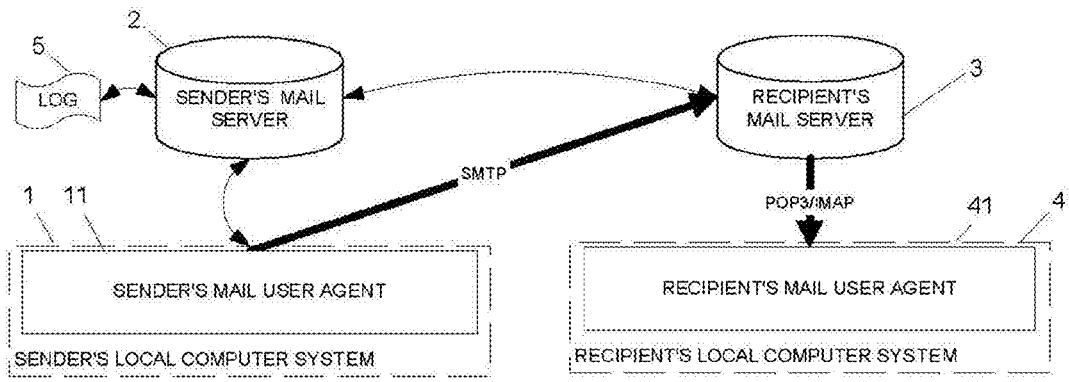
FIG. 2 shows a typical system of transferring electronic messages via computer network which is known from the prior art, but in which a method according to the invention is employed.
Figure 4A:
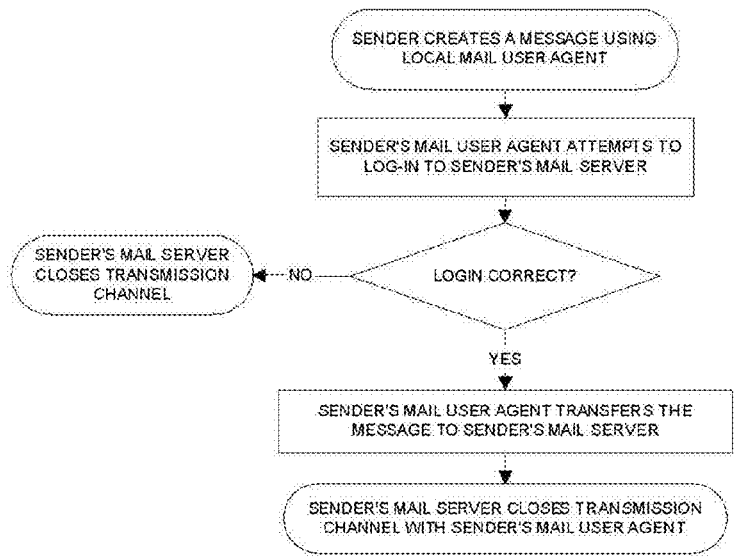
FIG. 4 shows particular steps of a method of transferring electronic messages which is known from the prior art.
Figure 4B:
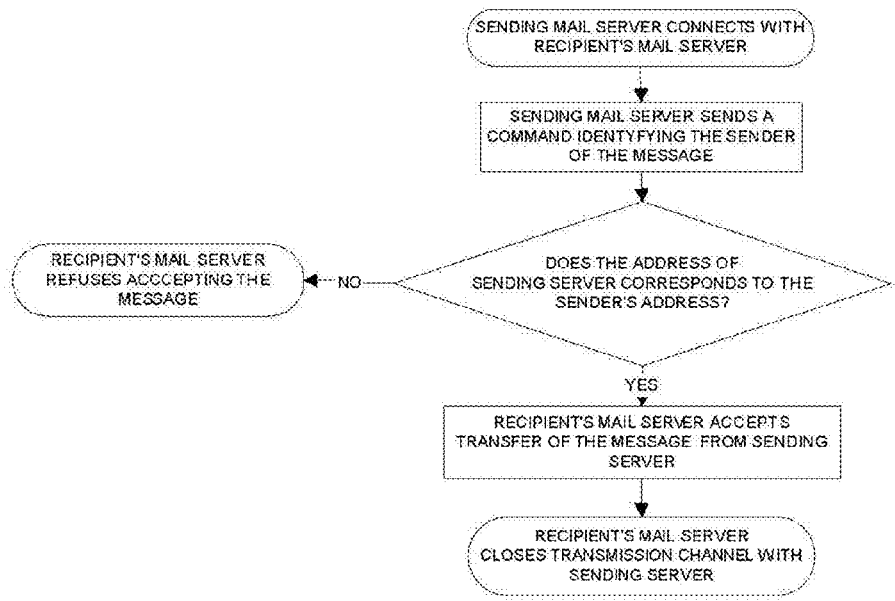
Figure 4C:
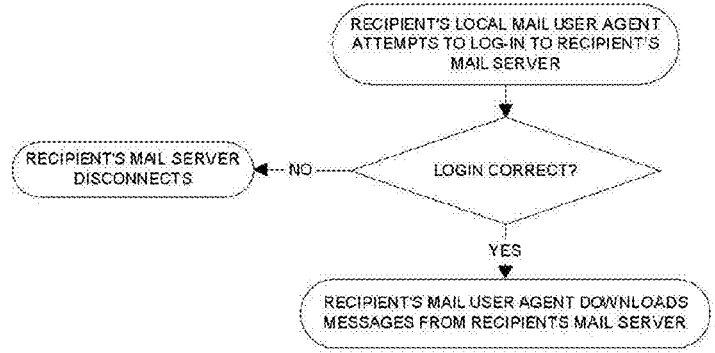
Figure 5A:
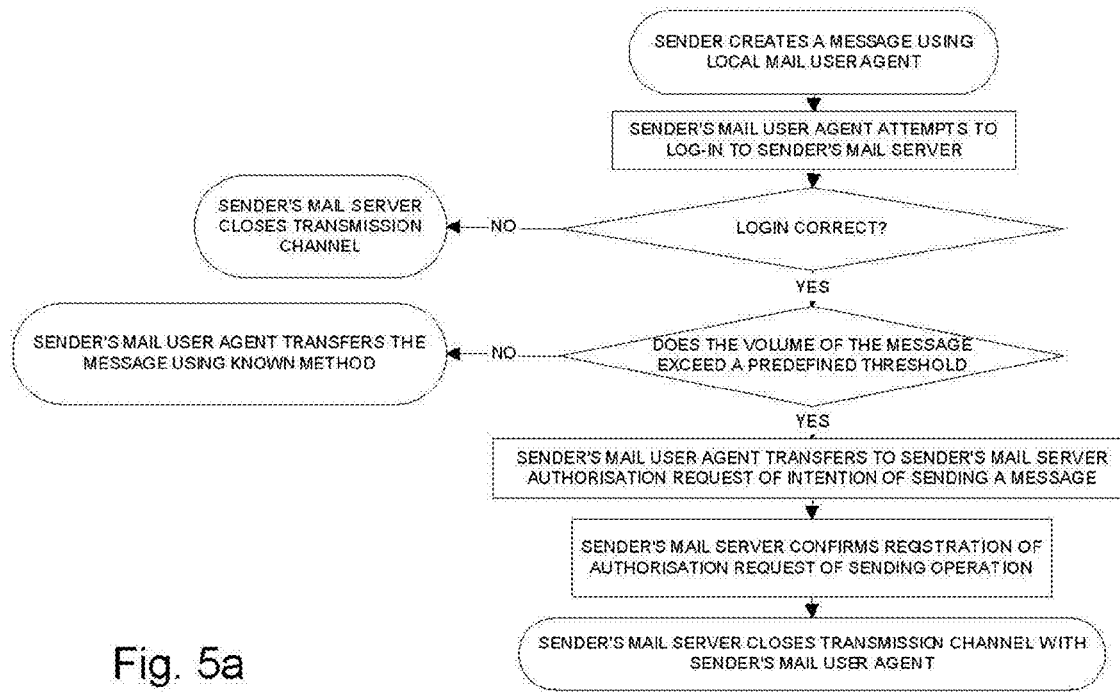
FIG. 5 shows particular steps of an exemplary method of transferring electronic messages according to the invention.

FIGS. 2 and 5 schematically shows an exemplary implementation of the invention. Similarly as in the case of the known method (see FIGS. 1, 4 and background art part of the specification), the first step of connection session shown in FIG. 5a is creating an e-mail message by the sender. Subsequently, a local mail user agent 11 logs in to a sender's server 2, where the sender possesses his mail account.

In case of correct passing through logging procedure, the local MUA 11 sends to the sender's MTA 2, instead of the created message, a request for registration of intended operation of transfer which comprises sender's address, recipient's address and the size of a message. The registration request may of course contains also other parameters such as date and time data, the subject of a message, lists of attachments, etc. In a response, a local MUA 11 receives a communication confirming registration of the request in a register 5 of the server 2 and disconnects. It is obvious that in a case when sender's server 2 is not capable to handle a method according to the invention, it shall reject a registration request for intended transferring operation thus giving a local mail user agent 11 a signal to send the message using known method as depicted in FIGS. 1 and 4.

Figure 5B:
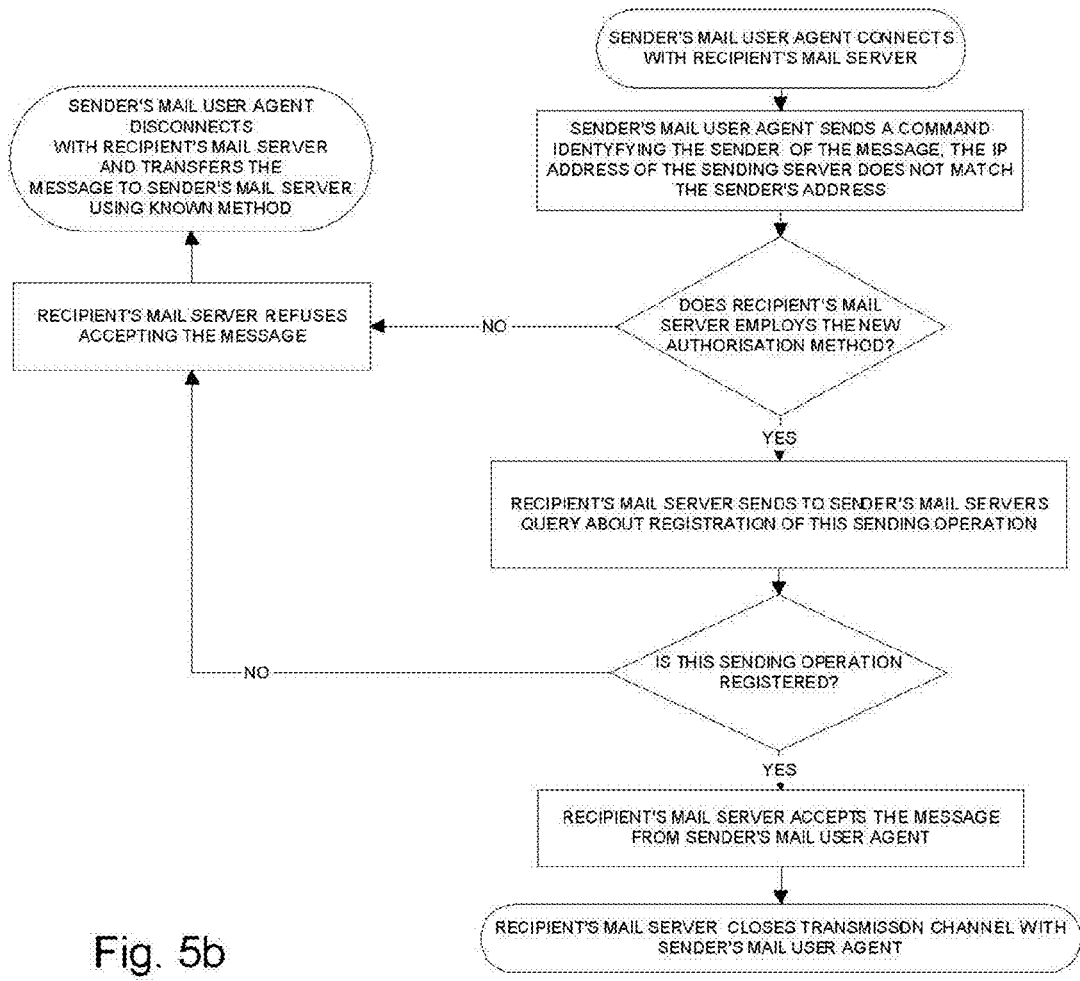

In subsequent connection session shown in FIG. 5b, a local mail user agent 11 establishes a connection with a recipient's server 3 and sends a command (in case of SMTP protocol—"MAIL FROM" command) identifying the message sender. As an address of the sending server, i.e. a computer system 1, where the local mail user agent 11 resides, does not correspond with the sender address, the recipient's server 3 refuses to accept the message in case of not handling a method of the invention. Otherwise it sends to the mail server 2 corresponding to the sender's address a request about registration of intended transferring operation. If sender's server 2 is not capable to handle a registration mechanism according to the method of the invention, it generates an error reply. The lack of the registration of intended transferring operation in register 5 of the server 2 means an attempt to send a message anonymously or an attempt to send a message after a predetermined period of time of storing the registration in registers 5 of the server 2, amounting e.g. one minute. In each of these cases, the recipient's server 3 denies accepting a message.

A message is accepted by the recipient's server 3 only if the intention of transferring a message for the recipient for which this server is designated has been registered by the sender's server 2. After receiving a message, the recipient's server 3 may also invalidate registration in the register 5 of the sender's server 2, thus preventing possibility of receiving the same message again. After all the messages have been sent to a given recipient's server 3 it closes transmission channel. Transferring messages to a recipient's local mail user agent is realized in a manner analogous to the one presented in FIG. 4c.

By using the method described above, it is thus necessary only to transfer e-mail only twice: for the first time between a sender's MUA 11 and recipient's MTA 3 and for the second time between recipient's MTA 3 and a recipient's MUA 41.

Figure 3:
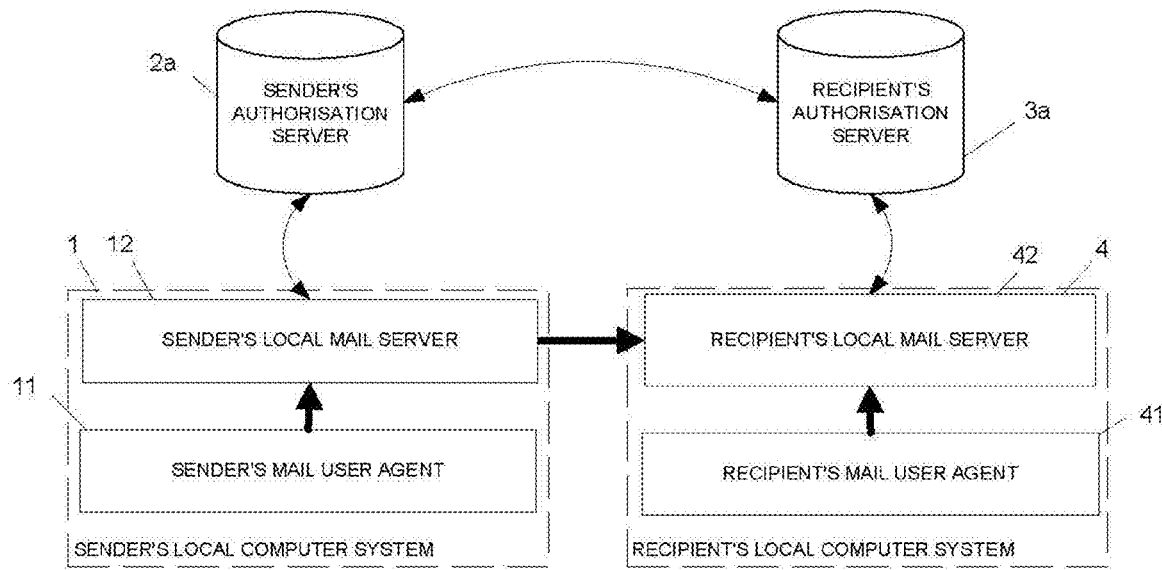
FIG. 3 shows another exemplary system of transferring electronic messages according to the present invention.
Figure 6:
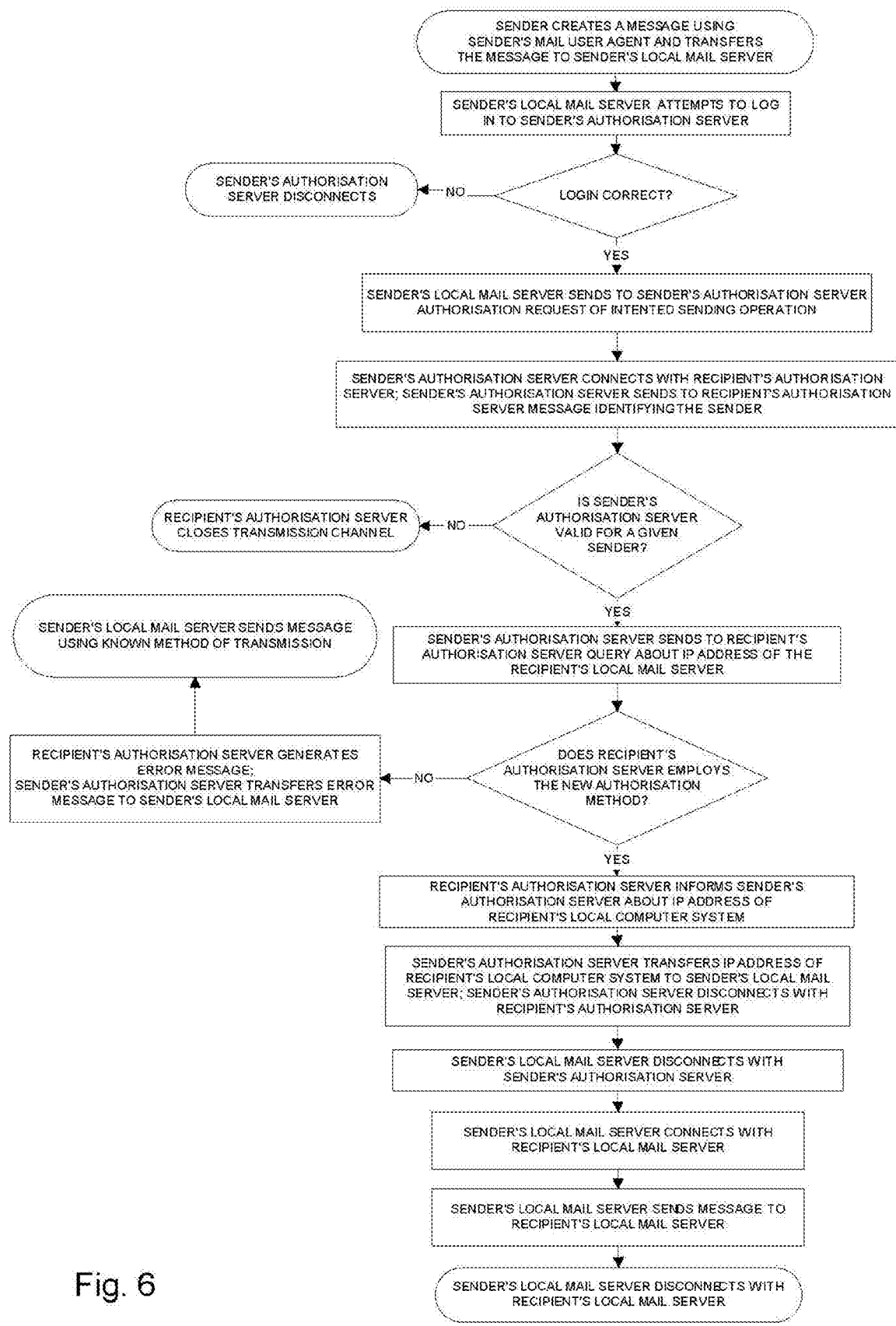
FIG. 6 shows particular steps of another exemplary method of transferring electronic messages according to the invention.

Another exemplary implementation of the invention is schematically illustrated in FIGS. 3 and 6. In this embodiment, e-mail clients of the sender 11 and the recipient 41 are configured in such a way that in both cases local computer systems of the sender 1 and the recipient 4 (so called localhosts with IP address 127.0.0.1) serve as incoming mail servers (POP3) as well as outgoing mail servers (SMTP). On the sender's local computer system 1, there is a program 12 installed, which operates in background and provides services of sender's local mail server, by sending and receiving e-mails transferred from and to MUA 11. Similar program 42 on the recipient's local computer system 4 sends and receives e-mails transferred from and to MUA 41.

Additionally, the recipient's local mail server 42 is responsible for sending to recipient authorisation server 3a communications informing about its factual IP address. As a recipient's local computer system 4 is commonly connected with the Internet via dynamic connection or temporary connection (for example by Dial Up switched line connection), this address may frequently change.

After creating a message using local e-mail client 11, the sender executes "Send" command available from a toolbar of mail user agent 11, and the message is sent to senders local mail server 11, which subsequently logs in to sender authorisation server 2a. After passing through logging procedure, the sender's local server 12 sends to the sender authorisation server 2a an authorisation request of intended operation of transferring a message. The sender authorisation server 2a establishes a connection with the recipient authorisation server 3a. If the address of the sender does not correspond to the address of the sender authorisation server 2a or the sender authorisation server is not authorised to send messages from the senders whose domain part of FQDA address corresponds to the address of the server 2a, then the recipient authorisation server 3 closes transmission channel.

In the opposite situation, the recipient authorisation server 3a gives to the sender authorisation server 2a information about the address of the recipient's local server 4, and the sender authorisation server 2a forwards this information to the sender's local server 12.

The last step consists in transferring the message by the sender's local mail server 12 to the recipient's local mail server 42 and closing transmission channel. The message may naturally be transferred between the sender's local server 12 and the recipient's local server 42 in parts in dependence of possibilities of setting up the transmission channel. From the recipient's local mail server 42, the e-mail is transferred to the recipient's local MUA 41 directly way or after executing by the recipient "Receive" command available from MUA 41 toolbar. In order to transfer an electronic message according to this implementation of invention, only one communication session is required.

It is obvious that in this case there are in a way two sender's servers present, that is the sender's local mail server 12 and the sender authorisation server 2a, as well as two recipient's servers, that is the recipient authorisation server 3a and the recipient's local mail server 42. For the invention point of view, the final recipient's server is of course the recipient's local mail server 42. In case the recipient's local mail server 42 is unavailable, the recipient authorisation server may naturally receive messages acting as the final recipient's server (similarly as described in relation to FIGS. 2 and 5).

Figure 7:
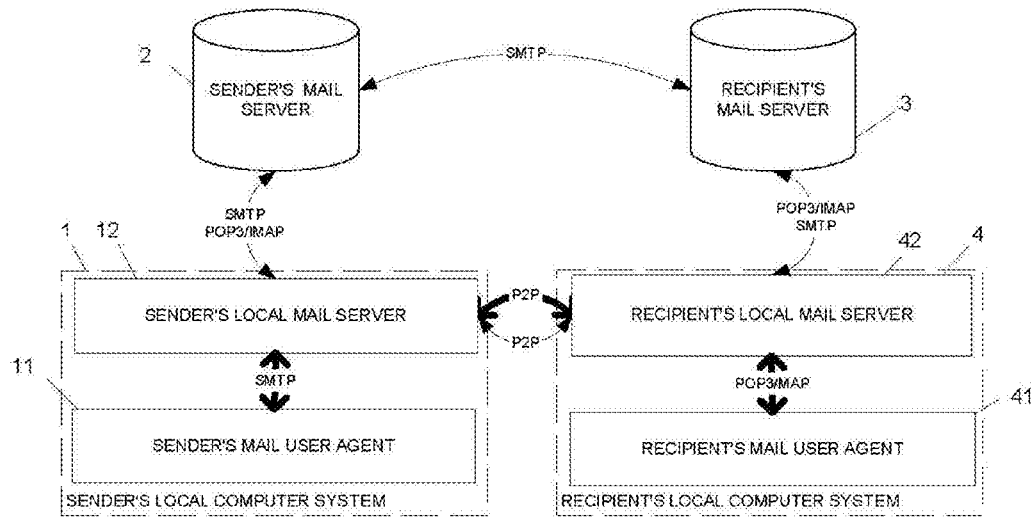
FIG. 7 shows another exemplary system of transferring electronic messages according to the present invention.
Figure 9:
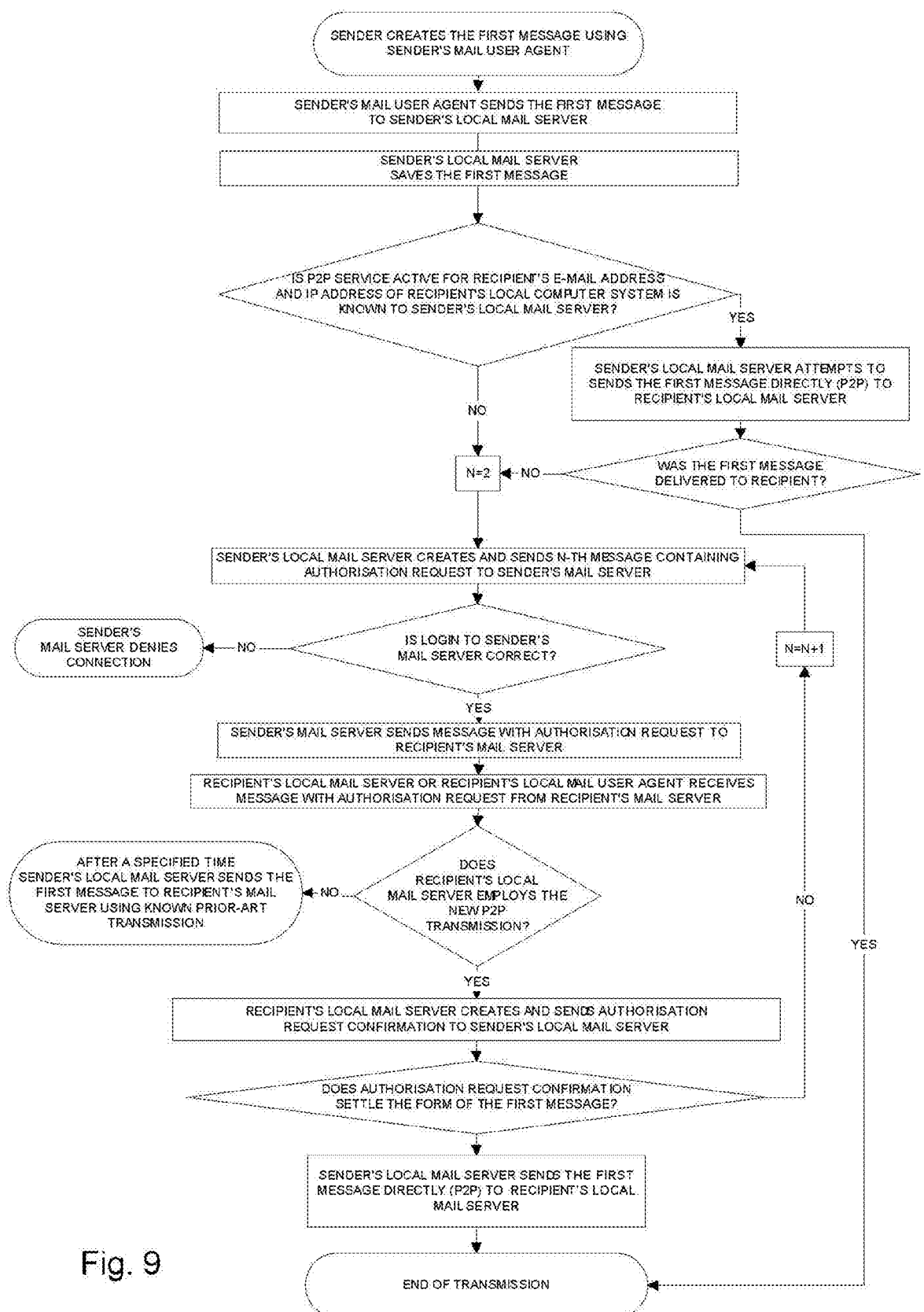
FIG. 9 shows particular steps of an exemplary method of transferring electronic messages according to the invention which substantially corresponds to the system depicted in FIG. 7.

FIGS. 7 and 9 schematically depicts another exemplary implementation of the invention. In this configuration, settings of e-mail clients of the sender 11 and recipient 41, indicate that the local computer systems of the sender 1 and the recipient 4 (localhosts) are both incoming mail servers (POP3) as well as outgoing mail servers (SMTP). On the recipient's local computer system 1, there is a background operating program 12, which is bound to ports 23 (SMTP), 80 (POP3) and 272 (new MAILP2P protocol) of the IP address of the local computer system. Program 12 provides services of sender's local mail server, which sends (SMTP) and receives (POP3/IMAP) electronic mail transferred from and to the mail user agent 11. Similar background operating program 42 installed on the recipient's local computer system 4 provides services of recipient's local mail server by sending and receiving e-mails transferred from and to the MUA 41. In the configuration settings of local mail servers 12 and 42 the actual outgoing and incoming mail servers for mail accounts of the sender and the recipient are indicated. In a majority of cases, local computer systems of the sender 1 and the recipient 4 are connected with the Internet via dynamic connection or temporary connection (for example by Dial Up switched line connection), in a result of which their IP addresses may frequently change.

Similarly as in a case of the known method of transferring a message, the first step of a connection session shown in FIG. 9 involves creation of suitable first e-mail by the sender with use of a local MUA 11 including typing the e-mail content, indication of the e-mail address of its recipient or recipients, stating the subject of the message, attaching additional files, etc. After message creation, the sender executes "Send" command from the toolbar of the mail user agent 11, and the application 11 sends the first message in a sense to itself and more precisely to a local mail server 12. The local mail server 12 records received first message for its later use.

In the next step, the local mail server 12 checks in its registers whether they contain the IP address of the local computer system 4 corresponding to e-mail address of the recipient and whether the recipient is able to handle the method of the invention. The address shall be stored in the registers if the communication channel of P2P connection between the sender and the recipient has been correctly constituted previously. The IP address might also have been introduced to these registers manually by the sender.

If the recipient's IP address and optionally the other parameters identifying the recipient are Known, then the senders local mail server 12 attempts to send the first message via P2P connection through port 272 (particularly using encrypted channel) directly to the recipient's local mail server 42. If the IP address of the recipient's computer system is not known or, despite the address being known, transferring of the first message was not successful, then the sender's local mail server 12 creates the second electronic message comprising an authorisation request of intention of sending a message to a given recipient. The request includes IP address of the sender's computer system 1, the sender's address, e-mail address of the recipient, the content of the first message and optionally the other parameters, such as a list of types and sizes of the attachments that are to be sent together with the first message.

In subsequent step, the sender's local mail server 12 sends the second authorisation message to the outgoing mail server 2, on which the sender has his e-mail account. Before sending the message, the sender must gain authorisation of his MTA 2, for example with use of SMTP AUTH or "POP3 before SMTP" mechanism, and in a case of incorrect passing through the authorisation procedure, the sender's server refuses connection. In the next step, the sender's server 2 sends via SMTP protocol (FIG. 7) an authorisation communication to the recipient's MTA 3, on which the recipient has his e-mail account. From the recipient's server 3, the message shall in turn be received by the recipient's local mail server 42 via POP3 or IMAP protocols. In the first case (POP3), the recipient's local mail server 42 may connect periodically, for example every 2 minutes (in dependence on given configuration settings thereof), to the recipient's server 3 in order to determine whether there are any new messages, particularly any new authorisation messages.

Obviously if the sender does not have a local mail server, an authorisation message shall be received from the recipient's MTA 3 by his mail user agent 41 as a common e-mail message. In such a case, an authorisation confirmation shall obviously not be send, and the sender's local server 12 shall send after predetermined period of time, in dependence on its configuration settings, the first actual e-mail message using the known method of transferring e-mail messages (cf. FIG. 4*a*). If however, the recipient's mail server 42 is capable to handle a method of the invention, in the next step it may determine whether the parameters of the first message are conforming to its default configuration settings or configuration settings defined by the recipient. It may for example determine whether the attachments, that the sender intends to send, agree as to the type of the attachments that are accepted by the recipient, etc.

In the next step, the recipient's local mail server sends via P2P channel (particularly via encrypted P2P channel) directly to the sender's local mail server a confirmation of the reception of an authorisation request, comprising acceptable parameters of the first message. If the parameters are not acceptable by the recipient, then the sender may negotiate them by sending another third message and so forth, up to obtaining acceptance of a form of the first electronic message given by the recipient's local mail server.

The final step includes sending the first message by the sender's local server 12 via channel P2P (particularly via P2P encrypted channel) directly to the recipient's local server 42 and ending the connection. Obviously a message may also be forwarded between the sender's local server 12 and the recipient's local server 42 in fragments in dependence of possibilities of setting up the connection between them. From the recipient's local mail server 42, the message is transferred to the recipient's local mail user agent 41 in a direct way or after executing by the recipient "Receive" command available from a toolbar of mail user agent 41.

In order to send the first substantial electronic message according to this implementation of the invention, there is one connection session required.

Figure 8:
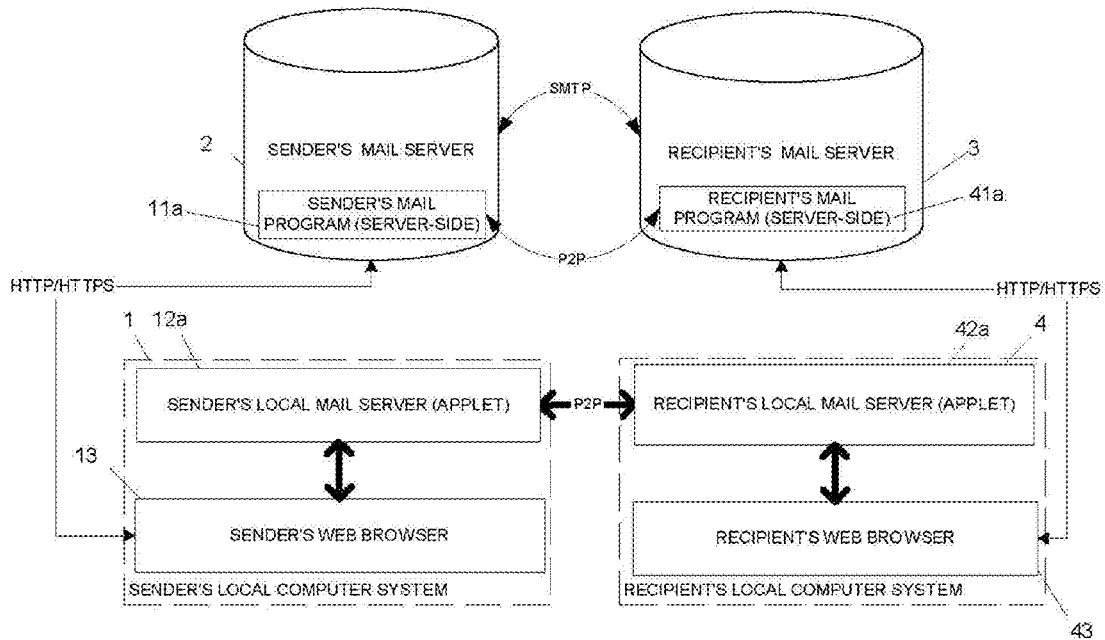
FIG. 8 shows yet another exemplary system of transferring electronic messages according to the invention used for web-mail user agents.
Figure 10:
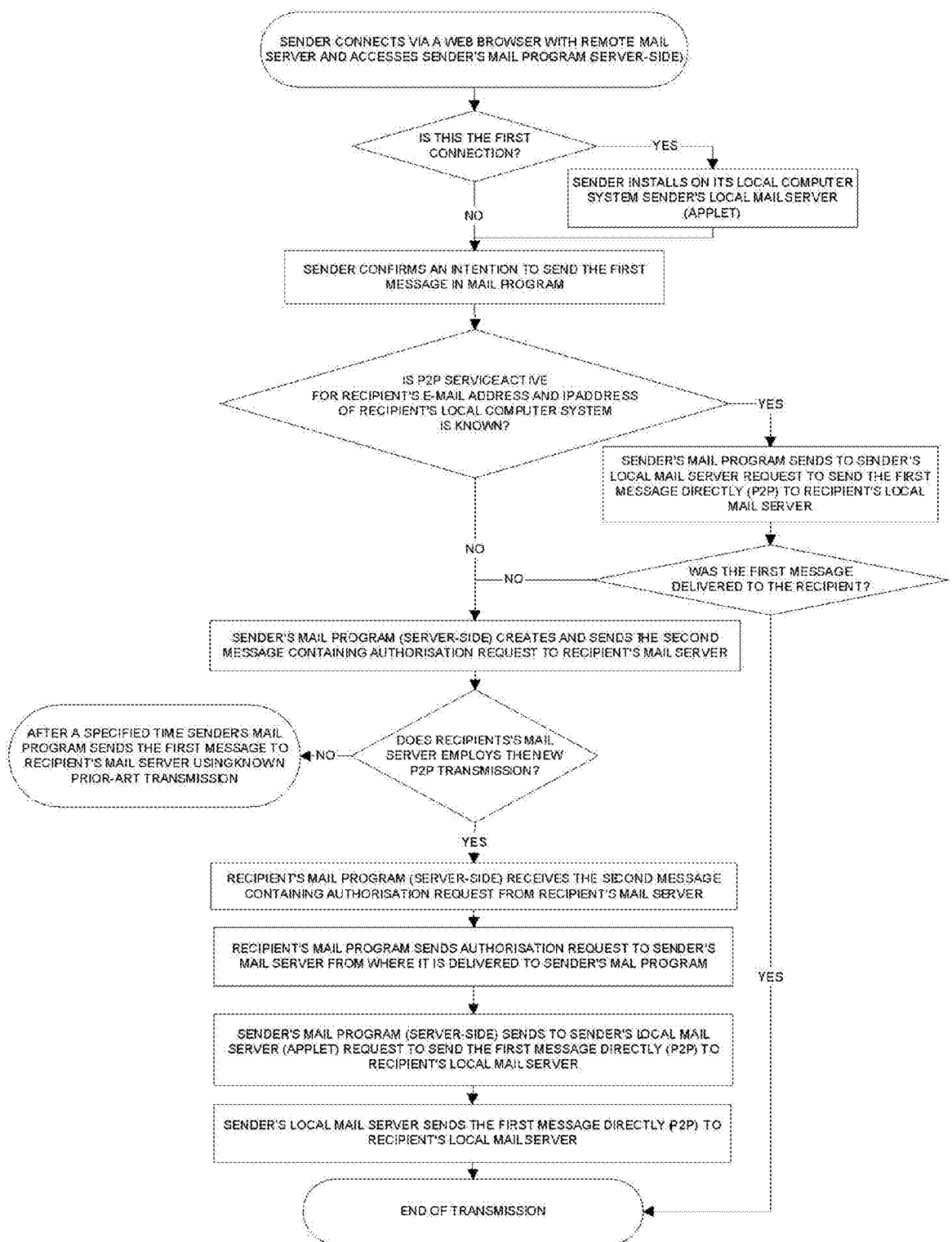
FIG. 10 shows particular steps of another exemplary method of transferring electronic messages according to the invention which substantially corresponds to the system shown in FIG. 8.

FIGS. 8 and 10 schematically illustrate another exemplary implementation of the invention that may be employed in e-mail clients handled by means of web browsers, such as Hotmail or Gmail, generally referred to as "webmail". In the first step, the sender connects via a web browser 13 with the sender's mail server 3 using HTTP protocol or cryptographic secure HTTPS protocol, and after correct logging on he gets access to his mail program 11*a*, operating as a server-side script on the sender's mail server (MTA) 2. The e-mail program 11*a*, being locally controlled by means of sender's web browser 13, during the first connection requests sender to install the applet 12*a* on the sender's local computer system 1. The applet 12*a* shall act as sender's local mail server functionally integrated with the e-mail program 11*a*.

Similar applet 42*a* in communication with the e-mail program 42*a* is installed on the recipient's local computer system 4.

Next, the sender creates the first e-mail and confirms requests to send it to a given recipient or set of recipients. The e-mail program 11*a* checks whether the recipient having a given e-mail address is able to handle a method of transfer according to the invention and whether IP address of the recipient's local computer system 4 is known. If so, the mail user agent 11*a* sends to the sender's local mail server 12*a* an instruction to send the first message via P2P channel directly to the recipient's local mail server 42*a*. In a case of lack of such information relative to the recipient, the mail user agent 11*a* creates and sends an authorisation request to the recipient's mail server 3. If the recipient's mail server 3 does not handle P2P transmission according to the invention, it shall not appropriately interpret an authorisation request. However the request may still be handled by the recipient's local mail server 42 (cf. FIGS. 7 and 9). In any case if it is not served, the sender's mail user agent 11*a* shall send the first message to the recipient according to a known method after some time.

On the other hand in the system and method shown in FIGS. 8 and 10, recipient's mail user agent 41*a* cooperates with the recipient's mail server 3. After the recipient logs in to his mail server 3, the recipient's mail user agent 41*a*, locally controlled by means of the recipient's web browser 43 obtains information about the IP address of the recipient's local system 4, which information is forwarded together with authorisation request confirmation to the sender's mail user agent 11*a*, in order to establish P2P channel between local servers 12*a* and 42*a* for transferring the first message.

The second authorisation message may also be obviously created and sent by the sender's applet 12*a* (instead of servlet 11*a*), and received by the sender's applet 42*a* (instead of servlet 41*a*), capable of handling a method of the invention, and appropriately integrated with e-mail web browser controlled programs of the sender 11*a* and the recipient 41*a*.

It is obvious that all the methods of transferring e-mail messages may be mutually connected. In other words, a local mail server being integrated with a local mail user agent, either in a form of an application (12, 42) operating between local mail user agent (11, 41) and remote MTA (2, 3) or in a form of an applet (12*a*, 42*a*) installed on a local computer system and integrated with a remote mail program (11*a*, 41*a*) and controlled by means of an web browser, may be used for sending and receiving messages. Thanks to backward compatibility of a method of P2P transmission according to the invention, it does not matter at all whether a recipient is capable to handle innovative P2P transmission system, as nevertheless a message shall reach him in a typical manner.

According to the invention a local mail server is equipped with appropriate mechanisms known from the prior art, enabling for proper communication through specified ports SMTP and POP3/IMAP with mail servers and on a specified port MAILP2P with other local mail servers without any difficulties resulting from operation on computer systems using firewalls, such as for example MSTM' Windows firewall. During a connection with Internet, it is thus possible, without infringing rules ensuring obtaining proper security level, to provide services to user with private, virtual or public IP address, using any possible NAT (network address translation) and PAT (port address translation) configurations that are usually used in firewall settings.

Configuration settings and characteristics of a local mail server handling a method according to the present invention may particularly comprise the following instructions, which for example may be assigned to all or only to selected e-mail addresses of mail users and/or may be dependent on the action effected by the user in response to a communication from his mail server:

automatically send authorisation request confirmation or ask user beforehand;

send authorisation request confirmation via P2P channel or via SMTP and POP3/IMAP channel;

always send the first message via P2P channel if it is only possible;

send information about a change of owned IP address to every authorised recipient;

do not accept or accept attachments of the specified types and sizes;

always create encrypted P2P channel or create encrypted channel on sender's request;

download the first message fragmentarily if a connection was been interrupted; and many others.

Moreover, the first message itself may also comprise additional parameters added for example in the subject field, options, or in the content, the parameters may for example determine the mode of transfer: standard via SMTP and POP3/IMAP protocols, or via P2P channel, P2P cryptographic channel, etc.

The above embodiments of the invention relate and discuss a transmission process between one sender and one recipient has been ed. It is however obvious that a message may be sent using a method according to the invention from one sender to many recipients.

Further, the particular steps of any of the inventive methods were described in a given order. It should be however understood that in alternative realization examples of the invention, the steps may be carried out in different order than the one described. Additionally, the described methods may be realized by means of hardware components and/or may be embedded in sequences of machine processed instructions, which may be used to enforce its execution by a machine, such as a general purpose processor or a dedicated processor or logical circuits programmed with use of such instructions. Such machine processed instructions may be stored on one or a number of machine readable carriers, such as CD-ROM, DVD discs or other optical disks, floppy disks, ROM, RAM, EPROM or EEPROM memories, smart cards or optical cards, and/or other types of machine readable carriers suitable for storing electronic instructions. For example, according to some exemplary embodiments of the invention, there are provided applications and/or software components, which may be executed on one or on some number of computers, for carrying out the above described methods. For instance, according to particular exemplary embodiments of the invention, there may be many software components configured to execution thereof on various hardware devices. Alternatively, the methods according to the invention may be implemented by appropriate combination of hardware and software elements. Although presented embodiments of the invention relate to internet e-mails, the persons skilled in the art shall be aware that the invention may also be employed for transferring electronic messages in any other transferring system.

In this way, on the basis of the above described exemplary embodiments of the invention, the innovative methods, systems and software products for transferring messages has been presented and discussed. The present description indicates some exemplary realizations, including implementations of solutions according to the present invention, wherein the persons skilled in the art shall certainly notice that it is easily to develop many modifications and variants of the presented embodiments, which should also be considered as belonging to the scope of the invention. Thus only the content of the patent claims may be regarded as a proper definition of the invention.

The invention claimed is:

1. A method of transferring electronic messages via telecommunication network, in particular a method of transferring internet electronic messages (e-mails), comprising the step of creating a first electronic message by a sender, characterised in that, it comprises the steps of:
   (a) creating and sending using a known method of transferring electronic messages a second electronic message to a recipient's mail server (3, 3a, 42, 42a), said second electronic message comprising an authorisation request of intention of sending said first electronic message to said recipient;
   (b) determination of whether said authorisation request of intention of sending said first electronic message is authorised by said recipient's mail server (3, 3a, 42, 42a) by authorisation request confirmation; and
   (c) establishing direct P2P channel between the sender's local computer system (1) and the recipient's mail server (3, 3a, 42, 42a) and accepting said first electronic message by the recipient's mail server (3, 3a, 42, 42a) through said direct P2P channel, if said authorisation request of intention of sending said first electronic message to this recipient was authorised by the recipient's mail server (3, 3a, 42, 42a).

2. The method of transferring electronic messages according to claim 1, characterised in that, authorisation of said authorisation request by the recipient's mail server (3, 3a, 42, 42a) involves registration of said authorisation request.

3. The method of transferring electronic messages according to claim 1, characterised in that, said authorisation request comprises an IP address of sender's local computer system and optionally at least one additional parameter chosen among others from the address of the sender, signature or the subject of said first electronic message, date and time of creating or sending and/or lists of attachments of said first electronic message, sender's cryptographic public-key (encrypting), an information promoting P2P transfer and/or text of said first electronic message, while said additional parameters of said authorisation request confirmation are chosen from recipient's cryptographic public-key (encrypting), acceptable types and sizes of attachments, acceptable size and/or other parameters of the first electronic message that are acceptable by the recipient.

4. The method of transferring electronic messages according to claim 3, characterised in that, said authorisation request confirmation is transferred by the recipient's local mail server (42, 42a) directly via P2P channel to the sender's local mail server (12, 12a).

5. The method of transferring electronic messages according claim 3, characterised in that, said steps (a) to (c) are performed if the volume of the message exceeds a predefined threshold.

6. The method of transferring electronic messages according to claim 1, characterised in that, said authorisation of said authorisation request performed by the recipient's mail server (3, 3a, 42, 42a) is valid within a predefined period and/or invalidated after step (c).

7. The method of transferring electronic messages according to claim 1, characterised in that, said authorisation request confirmation is transferred by the recipient's local mail server (42, 42a) directly via P2P channel to the sender's local mail server (12, 12a).

8. The method of transferring electronic messages according claim 7, characterised in that, said steps (a) to (c) are performed if the volume of the message exceeds a predefined threshold.

9. The method of transferring electronic messages according to claim 1, characterised in that, recipient's local mail server (42, 42a) sends to the sender's local mail server (12, 12a) said authorisation request confirmation whenever the recipient's local mail server (12, 12a) IP address changes.

10. The method of transferring electronic messages according to claim 1, characterised in that, before the step (c) of sending the first electronic message via direct P2P channel, the method further comprises more than one exchange of an authorisation request and corresponding authorisation request confirmation between sender's local mail server (12, 12a) and recipient's mail server (3, 3a, 42, 42a) in order to negotiate the form of the first electronic message that is acceptable by recipient's mail server (3, 3a, 42, 42a).

11. The method of transferring electronic messages according to claim 1, characterised in that, said sender's local mail server (12) and/or said recipient's local mail server (42) has a form of an application operating between a local mail user agent (11, 41) and a remote mail server (2, 3).

12. The method of transferring electronic messages according to claim 11, characterised in that, said local mail user agent (11a, 41a) is operated via a web browser (webmail) (13, 43) and said sender's local mail server (12a) and/or recipient's local mail server (42a) has a form of an applet installed on a sender's local computer system (1) and/or recipient's local computer system (4) and operated via a web browser (13, 43) and/or via the local mail user agent (11a, 41a).

13. The method of transferring electronic messages according to claim 1, characterised in that, said sender's local mail server (12) and/or recipient's local mail server (42) is(are) integrated with a local mail user agent (11, 41).

14. The method of transferring electronic messages according claim 1, characterised in that, said steps (a) to (c) are performed if the volume of the message exceeds a predefined threshold.

15. A system of transferring electronic messages via telecommunication network, in particular a system of transferring internet e-mails via a P2P channel, characterised in that, the system comprises:
   a sender's local computer system (1), said sender's local computer system adapted for creating and sending a first electronic message to a recipient;
   a recipient's mail server (3, 3a, 42, 42a), in communication with the recipient;
   an authorization application for obtaining authorization for direct transmission of electronic messages between the sender's local computing system and the recipient's local electronic message server, said authorization application creating and sending a second electronic message to the recipient's electronic mail server, the second electronic message comprising an authorisation request of intention of sending said first electronic message directly from the sender's local computer system to the recipient's mail server (3, 3a, 42, 42a), and determining whether said authorisation request of intention of sending said first electronic message is authorised by said recipient's mail server (3, 3a, 42, 42a) by authorisation request confirmation;
   a channelling application for establishing, upon receipt of authorization, a direct P2P channel between the sender's local computer system (1) and the recipient's mail server (3, 3a, 42, 42a) for supporting direct authorized electronic message transmission therebetween, such that the direct P2P channel is established between the sender's local computer system (1) and the recipient's local mail server (3, 3a, 42, 42a), said recipient's local mail server accepting said first electronic message through said direct P2P channel, if said authorisation request of intention of sending said first electronic message to the recipient was authorised by the recipient's mail server.

16. A computer-readable non-transitory storage medium containing executable instructions for a system of transferring electronic messages via telecommunication network, in particular for a system of transferring internet electronic messages (e-mails), characterised in that, said executable instructions comprise an execution of steps of
   (a) creating and sending using a known method of transferring electronic messages a second electronic message to a recipient's mail server (3, 3a, 42, 42a), said second electronic message comprising an authorisation request of intention of sending said first electronic message to said recipient;
   (b) determination of whether said authorisation request of intention of sending said first electronic message is authorised by said recipient's mail server (3, 3a, 42, 42a) by authorisation request confirmation; and
   (c) establishing direct P2P channel between the sender's local computer system (1) and the recipient's mail server (3, 3a, 42, 42a) and accepting said first electronic message by the recipient's mail server (3, 3a, 42, 42a) through said direct P2P channel, if said authorisation request of intention of sending said first electronic message to this recipient was authorised by the recipient's mail server (3, 3a, 42, 42a).

\* \* \* \* \*